United States Patent [19]

Thijssen

[11] 4,143,524
[45] Mar. 13, 1979

[54] PROCESS AND APPARATUS FOR SEPARATING CRYSTALLIZABLE MATERIALS FROM A MULTI-COMPONENT SYSTEM

[75] Inventor: Henricus A. C. Thijssen, Son, Netherlands

[73] Assignee: Douwe Egberts Koninklijke Tabaksfabriek-Koffiebranderijen-Theehandel B.V., Joure, Netherlands

[21] Appl. No.: 796,388

[22] Filed: May 12, 1977

Related U.S. Application Data

[63] Continuation of Ser. No. 637,933, Dec. 5, 1975, abandoned.

[30] Foreign Application Priority Data

Dec. 6, 1974 [GB] United Kingdom ............... 52900/74

[51] Int. Cl.² ............................................. B01D 9/04
[52] U.S. Cl. ........................................ 62/542; 62/532; 62/123
[58] Field of Search ................. 62/532, 541, 542, 543, 62/123, 124, 347, 349, 352

[56] References Cited

U.S. PATENT DOCUMENTS

| | | | |
|---|---|---|---|
| 2,239,234 | 4/1941 | Kubaugh | 62/532 |
| 2,340,721 | 2/1944 | Whitney | 62/540 |
| 2,354,633 | 7/1944 | Bedford | 62/543 |
| 3,338,065 | 8/1967 | Ashley | 62/542 |
| 3,820,349 | 6/1974 | Styron et al. | 62/532 |

Primary Examiner—Norman Yudkoff
Attorney, Agent, or Firm—Cushman, Darby & Cushman

[57] ABSTRACT

A process and apparatus are described for separating crystallizable material from a liquid multi-component system involving a series of cycles wherein (a) the liquid is confined in a space having a large heat exchange surface; (b) heat is withdrawn from said surface to crystallize at least part of said material; (c) the crystallizable material is removed; (d) the crystallized material so removed is sub-divided; and (e) the resulting product is treated to separate the crystallized material from the rest of the multi-component system.

2 Claims, 5 Drawing Figures

PROCESS AND APPARATUS FOR SEPARATING CRYSTALLIZABLE MATERIALS FROM A MULTI-COMPONENT SYSTEM

This is a continuation of application Ser. No. 637,933, filed Dec. 5, 1975 now abandoned.

The present invention relates to a process and apparatus for the separation of crystallizable material out of a multi-component liquid system, whereby in a first phase of the process crystallized material is produced within that multi-component liquid system by cooling. In most cases the cooling is pushed only so far that mother liquor remains, after which is subsequent phases of the process a mechanical separation (by which we mean a separation without phase transformation) is accomplished between the crystallized material and the mother liquor. In some other special cases the cooling is pushed so far that the multi-component system is totally solidified, after which it is subjected to a process of sublimation, by which process a component is sublimated away, leaving behind substantially the other components of the multicomponent system.

Widespread use of both kinds of processes is made in the case that the crystallizable component is ice. In that case the processes in question are known as respectively freeze concentration and freeze drying.

The first mentioned process, whereby the cooling is pushed only so far that mother liquor remains is not only technologically very important in the case of freeze concentration of fruit juices, coffee extract and the like, but quite generally for the separation of a wide variety of crystallizable chemical compounds from their solutions in solvents like water, alcohol or benzene.

In these cases, it is on the grounds of economy of the utmost importance that the crystals are as little as possible contaminated with the mother liquor in those cases where the valuable material resides in the crystals, contamination with mother liquor results in a less pure product which may necessitate a second crystallization process. On the other hand, when the substance to be recovered is to be found in the mother liquor, valuable material is lost by being discarded with the crystals (e.g. coffee extract contaminating the ice crystals in a freeze concentration process). A widely used process for the separation between a mass of crystals and mother liquor is centrifugation. The use of a centrifuge, however, has distinct disadvantages. First, in the case of e.g. fruit juices, coffee extract and the like, flavor components may be lost by volatilization; secondly, oxidation of chemically delicate components may take place leading to off-flavours. Moreover, generally removal of the mother liquor is not complete in one pass. These inadequacies of the centrifugation process have led to the development of the 'washing column', e.g. as described in U.S. Pat. Nos. 3,777,892 and 3,872,009. Presses are also often used like in the case of freeze concentration of wine.

In all processes whereby the crystals are separated from the mother liquor it is important to have the crystals or crystal agglomerates so large and so homogeneous in size that separation from the mother liquor is easily accomplished. The resistance against liquid flow through the mass of crystals will be the lower, the larger the crystals are and the more homogeneous in size. This is of particular importance when a washing column is being used. The packed column of crystals or crystal agglomerates will build up considerable resistance against liquid flow if the requirements about size and homogeneity of the crystals are not sufficiently met, which will adversely influence the capacity of the installation.

Crystallization processes for the separation in substantially pure form of a crystallizable component out of a multi-component liquid system whereby the liquid is cooled creating crystals and a mother liquor, normally involve cooling this liquid while it is thoroughly agitated (e.g. in a scraped surface heat exchanger) thereby inducing nucleation and having the nuclei grow while in suspension. This is what we might call a dynamic process of crystallization. As fresh liquid is constantly brought into contact with the heat exchange surface through which the cooling takes place, new nuclei are constantly formed. Numerous methods have been proposed to advantageously influence size and homogeneity of the crystals in a 'ripening' process, whereby growth and recrystallization take place. More often than not these goals are not sufficiently attained, and if attained the equipment is rather bulky and the processes need careful regulation.

Now directing our attention to cases whereby crystallized material of a component within a substantially solidified matrix is sublimated away, the following can be said about a widely used method of freeze drying.

The multi-component system, as the case may be in the shape of a viscous liquid or a — sometimes foamed — slurry is spread out in a relatively thin layer on a conveyor band, situated in a low-temperature freezing chamber. The conveyor band is cooled e.g. by blast freezing with air or by squirting a cold liquid with low vapour pressure such as a glycol-water mixture at its underside. The frozen product is removed from the conveyor and, as the case may be after proper preparation, sluiced into a high vacuum chamber where the sublimation takes place.

An example of this kind of process is to be found in the freeze drying of coffee extract for the production of instant coffee. If requires a freezing chamber of very large dimensions whilst most of the energy needed for cooling is lost, notwithstanding good isolation.

An object of the invention is to provide a process and an apparatus which both in the case whereby the separation of the crystallized crystallizable material is accomplished in a mechanical way as in the case whereby this separation is accomplished by sublimation of the crystallized material, are respectively more efficient and easier to regulate, and less bulky than what is known in the prior art. The inventive concept is as simple as it is radical in its departure from the principles hitherto applied in the art at issue.

The process according to the invention for separating crystallizable material out of a multi-component liquid system comprises batchwise performed cycles, each cycle comprising sequentially the following steps:

a. a first step wherein a batch of the liquid is confined in a space with large heat exchange surface per unit volume of liquid;

b. A second step in which heat is withdrawn through said heat exchange surface so as to crystallize at least part of the crystallizable material and create a substantially coherent matrix of crystals;

c. a third step wherein the material after the foregoing treatment present in the space mentioned under (a) is extracted out of that space;

d. fourth step wherein the material extracted in step (c) is broken up in such a way as to create particles of a size suitable to the treatment in step (e);

e. a fifth step in which the mass obtained in the foregoing step is treated according to a suitable method to substantially separate crystallized material from the rest of the multi-component system.

Now when speaking in the foregoing about a crystallizable material which we want to separate out of the multi-component system this will generally be one of the components which we want to separate out of the system in substantially pure condition. In principle however the crystallized crystallizable material may consist of mixed crystals (in the sense of more than one component in any one crystal) this case thus not being excluded.

With the term 'liquid system' is meant any system having sufficient fluidity to be pumpable and be readily introduced in the space mentioned under (a). Thus. e.g. a slurry is possible, containing solid material, and a foam, containing gas or gas and solid material.

Speaking of a 'space with large heat exchange surface' we mean a space, or of course combination of spaces, which can be found in any equipment which may be called a 'static heat exchanger' whether known in the art or not. Under 'static heat exchanger' we understand any heat exchanger adapted to cool batchwise liquid introduced in its treating compartment in order to induce crystallization and not provided with appurtenances to keep the liquid in a state of agitation while the cooling is proceeding. Generally the space we use has to be rather narrow in order to keep the time necessary for an adequate degree of solidification of the liquid in that space within an economically acceptable range. 'Narrowness' in this sense is to be understood in such a way that the crystallization process does not need to proceed more than about 5 - 25 mm away from the heat exchange surface. This we will call the 'maximum conductive distance'.

Though spaces with flat heat exchange surfaces are not excluded, very conveniently long metal tubes can be used, particularly those having an inside diameter of about 20-30 mm; thus a maximum conductive distance of about 10-15 mm. These tubes can e.g. be provided each with a mantle for cooling purposes or they may be arranged as a bundle within one shell (as in a shell-and-tube heat exchanger).

Now, if we intend to use a mechanical method to separate the crystallized crystallizable material from the rest of the multi-component system, we will push the cooling in step (b) so far that the components which we do not want to mix with the crystallized crystallizable material remain in the liquid phase, be it in solution or in suspension. This liquid phase will be embedded in a matrix of crystals.

Preferably the cooling in this second step will be pushed so far that the matrix of crystals formed will bridge the space of the treating compartment.

If on the other hand we want to use sublimation as e.g. in freeze drying, we will normally conduct the cooling in such a way that the liquid content of the space will solidify in its totality.

The extraction in step (c) of the material present in the space after the cooling step (b) will be conveniently performed by supplying a small amount of heat through the heat exchange surface, just sufficient to release the mass. This mass may fall out of the space by its own weight. Generally however, it will be desirable to push the mass out of the space by the application of pressure. This may be accomplished by a number of ways e.g. with gas or with a piston. In many cases the pressure to expel the crystal mass from the narrow space can conveniently be obtained by the introduction under pressure of a new batch of liquid to replace the treated batch. This means that the third step (c) of the cycle for any one batch of liquid coincides with the first step (a) of the cycle for the next batch of liquid to be treated.

Advantageously the crystal mass will not be completely expelled out of the narrow space, but part of it will be left remaining at the 'expelling end' of the narrow space. This will act as a 'plug' to ensure proper separation between a treated batch and the next one yet to be treated.

Extraction and supply of heat through the heat exchange surface as mentioned above can be performed in any conventional way, but in a preferred embodiment of the invention using e.g. tubes as described above, heat is withdrawn in the first step of the cycle by connecting the space around the tubes with the evaporation chamber of a refrigerating unit and heat is supplied in the third step of the cycle by connecting said space with the condensation chamber of the refrigerating unit.

Breaking up of the material extracted from the narrow treating space can be performed in any conventional way, but advantageously this is done e.g. by a set of knives attached to a rotatable disk placed at that end of the space where the material emerges in the third step (c).

Now in the case described above whereby the separation of the crystallized crystallizable material has to be performed in a mechanical way the mixture of crystals and mother liquor obtained in the fourth step (d) is often not sufficiently fluid to be easily fed to the separatory device which has to separate the crystals from the mother liquor.

If this holds true advantageously the broken up mass may therefore be transformed into a pumpable slurry or suspension by mixing it with mother liquor which is recycled from the separatory device.

The process as described above is not continuous. As the second step of the process in which heat is withdrawn so as to ensure crystallization takes much more time than the third step in which the crystal mass in the narrow space is extracted from the treating space, advantageously a buffer will have to be created of treated material to be fed to the separatory device.

It is, however, possible to obviate this by parallel connection of a series of treating units and having each unit start its performance a little later than the foregoing one. If e.g. we have ten units the first may be performing the extracting step (c) (and at the same time step (a)), while the nine others will be performing the crystallizing step (b).

After the first unit has finished the expelling step, the second unit will start with expelling. The first unit will have ended its second round of cooling when the tenth unit is through with its expelling step. In this way a virtually continuous stream of material may be kept feeding the separatory device.

According to another aspect of the invention, apparatuses are provided specifically adapted for use in the processes described above. The apparatuses according to the invention for separating part of the crystallizable component in substantially pure condition from a multi-component liquid system will comprise:

a. a static heat exchanger;

b. means operationally connected with said heat exchanger, adapted to subdivide a substantially coherent matrix of crystals, formed in the treating-compartment of said heat exchanger after extraction of this matrix of crystals out of the treating-compartment, into particles of a predetermined size.

c. means adapted to separate crystallized material from a multi-component liquid system which has been partly or completely solidified by cooling.

Reiterating what has been already said above, under 'static heat exchanger' we understand any heat exchanger adapted to cool batchwise liquid introduced in its treating compartment in order to induce crystallization and not provided with appurtenances to keep the liquid in a state of agitation while the cooling is proceeding.

A multiplicity of these static heat exchangers may be arranged in parallel connection and provided with means adapted for sequential functioning (as already explained above), in order to obtain a virtually continuous output of treated material.

Each of the static heat exchangers may be provided with separate means for subdividing the output of this heat exchanger, but a multiciplity of cooperating static heat exchangers may also be provided with one means for subdividing their output.

In a preferred embodiment of the invention the static heat exchanger will be tubular. In its simplest form this will be one metal tube, but conveniently it will comprise a bundle of parallelly arranged tubes. These tubes may be each surrounded by a tubiform mantle or together enclosed in a shell e.g. as in a shell and tube heat exchanger. Conveniently the inside diameter of the tubes will be about 10–30 mm.

The means to subdivide the matrix of crystals mentioned under (b) will conveniently comprise a disk provided with knives and means to rotate said disk. This disk will preferably be located just outside that end of the tubes where the matrix of crystals emerge when they are released and extracted from the tubes. Additional to the knives for cutting and breaking up the 'column' of material emerging from the tubes the disk will conveniently be provided with slots as passageways for the particles created by this cutting action.

In the case that the cooling of the multicomponent liquid system is carried only so far that mother liquor remains and consequently the ultimate separation of the crystal-agglomerates and the mother liquor is accomplished by mechanical means, it is advantageous to place the disk just below the bottom end of the tubes, while these, in function, will preferable be in a substantially vertical position.

In the case however that the cooling of the system is carried so far as to solidify the total liquid content and the ultimate separation of one of the crystallized components from all the rest is accomplished by sublimation (specifically in freeze drying) it is preferred to locate the cutting disk just above the upper end of the tubes, while these, in function, will again preferably be in a substantially vertical position.

The apparatus according to the invention as just defined above under (a) and (b) may be combined with the following appurtenances to form one unit:

d. means to withdraw heat from the treating compartment of the heat-exchanger mentioned under (a) and e. means to supply heat to said treating compartment.

The means mentioned under (d) (e) may conveniently comprise a refrigerator unit and means to alternately connect its evaporation chamber and its condensation chamber with the space surrounding the treating chamber wherein the coolant of that refrigerator has to circulate.

Examples of apparatuses according to the invention and the way these operate are illustrated in the FIGS. 1–5.

FIG. 1 is a schematic representation of an apparatus according to the invention connected to a washing column and suitable e.g. for the freeze concentration of aqueous systems such as coffee extract and fruit juices. In this figure the following parts are shown:

Figure 1:
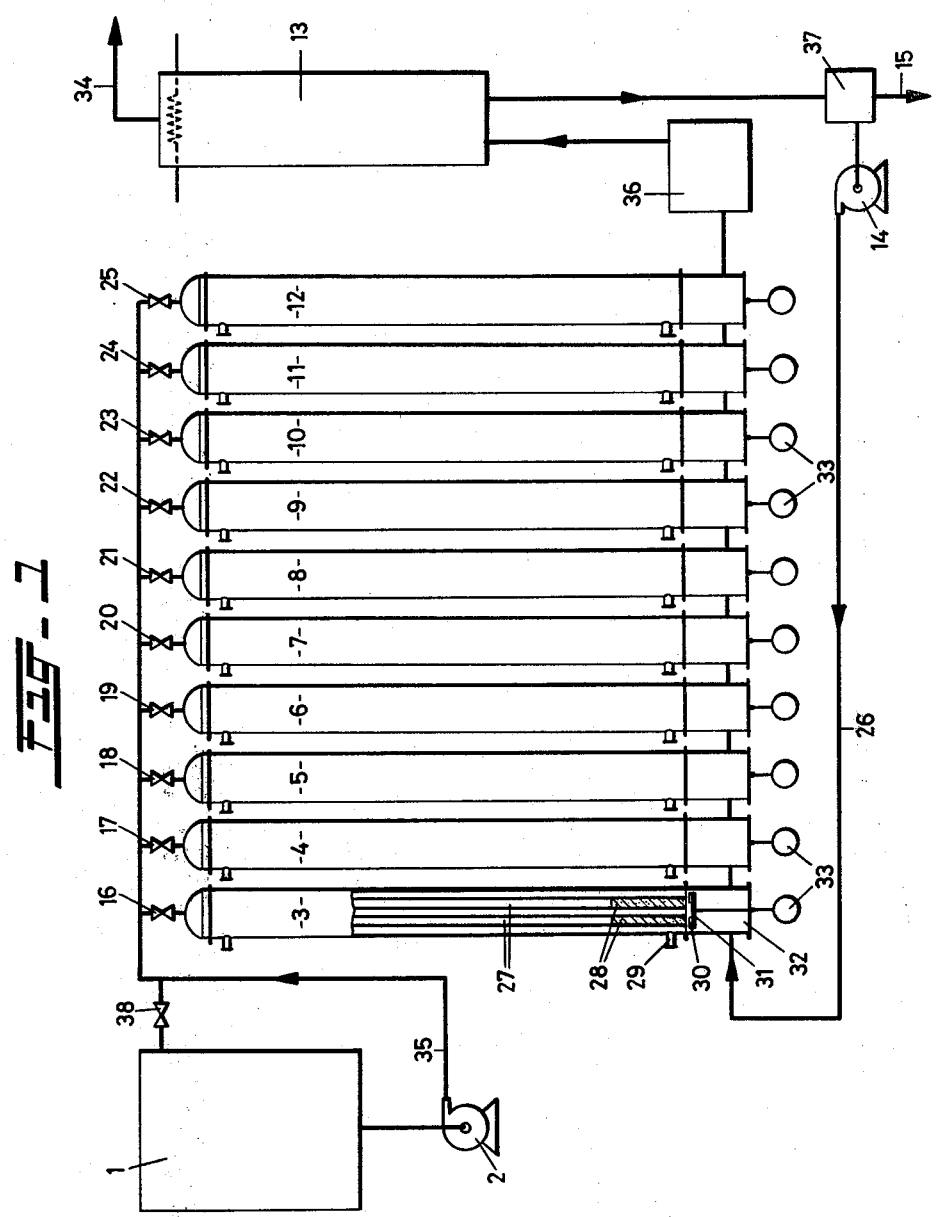
FIG. 1 shows a schematic view of an apparatus according to the present invention.

a feed pump 2 with constant out-put, to dose a predetermined volume of liquid for each batch to be treated, fed from storage vessel i.

a number of identical shell and tube heat exchangers 3 to 12 mounted in parallel and connected to a central feed line by valves 16 to 25. Below the heat exchangers an equal number of grinding means are provided for breaking up the columns of ice and concentrate and simultaneously mixing the broken up ice conglomerates with recirculated concentrate a washing column 13, represented schematically for separating ice and concentrate a concentrate recycling pump 14 a concentrate outlet 15 a melt water outlet 34 a concentrate recycle line 26

'buffering' vessels 36 and 37 a safety valve 38

The process as it takes place in one heat exchanger will be described in a general way. At the end of each freeze cycle of heat exchanger 3 pump 2 pumps a given quantity of feed solution from storage tank 1 through line 35 to shell and tube heat exchanger 3, valves 17 to 25 being closed. The columns of ice crystals and enclosed concentrate which have formed in the heat exchanger tubes during freezing are simultaneously forced out of the tubes. The columns of ice have first been released from the tube walls by briefly applying heat as described below. A new freezing cycle starts when only a relatively small frozen 'plug' 28 remains in each tube 27 of the heat exchanger 3. At that moment valve 16 is closed and coolant from the refrigerating unit 29 (schematically shown) is introduced into the space between the shell and the tubes of heat exchanger 3 through valved line 29. The remaining plugs of ice are immediately frozen to the walls of the tubes 27 and the fresh solution starts to crystallize in the tubes.

At the end of each freezing cycle heat exchanger 3 is briefly connected to the condensation chamber of the refrigerating unit instead of to the evaporator chamber, a thin film of liquid being formed between column and tube wall. After valve 16 has been re-opened, the columns of ice and concentrate are replaced by fresh solution as described above. The frozen columns expelled by the fresh feed solution are broken up upon leaving the tubes by the knives 30 mentioned above. Through apertures in the disk the mixture of ice particles and concentrate passes to mixing vessel 32, which contains concentrated mother liquor. The cutting position of the knives and the speed of the rotation of the disk control the size of the ice particles. The speed of rotation of the disk, in combination with the number of knives, determines the time required to force out the columns of ice. The rotating disk is driven by a motor 33 located outside the heat exchanger.

The mixture of ice particles and concentrate enters the mixing vessel at regular intervals and they must be transformed into a slurry which can easily be processed by the separating apparatus, which in this embodiment of the invention is a washing column 13 schematically shown. The percentage of ice in the slurry should preferably be about 25%–35% by weight of the slurry. To this end concentrate recycling pump 14 continuously circulates part of the concentrate from washing column 13 through buffering vessel or surge tank 37 so that in the mixing vessel 32 the mixture of ice particles and concentrate is mixed with recycled concentrate in the right proportion. The slurry is buffering vessel or surge tank 36 transported to the washing column. In the washing column, the mother liquor and crystals move in opposite directions, the mother liquor being washed from the crystals by melting of the crystals and removal of the mother liquor at one end of the washing columm, the melted crystals being removed at the other end of the column. (See U.S. Pat. Nos. 3,777,892 and 3,872,009 previously referred to.)

The shell and tube heat exchangers are connected in such a way that at any given moment one heat exchanger is engaged in the expelling step, while the other exchangers are engaged in the cooling step. Thus a suspension of ice and concentrate is for all practical purposes continuously fed to the washing column and the refrigerating unit is loaded evenly. The concentrate discharged through outlet 15 and the washing water discharged through outlet 34 taken together have the same composition as the feed solution.

The melter of the washing column is connected to the condenser of the refrigerating unit and so is the heat exchanger in which a film of liquid is being formed.

Figure 2:
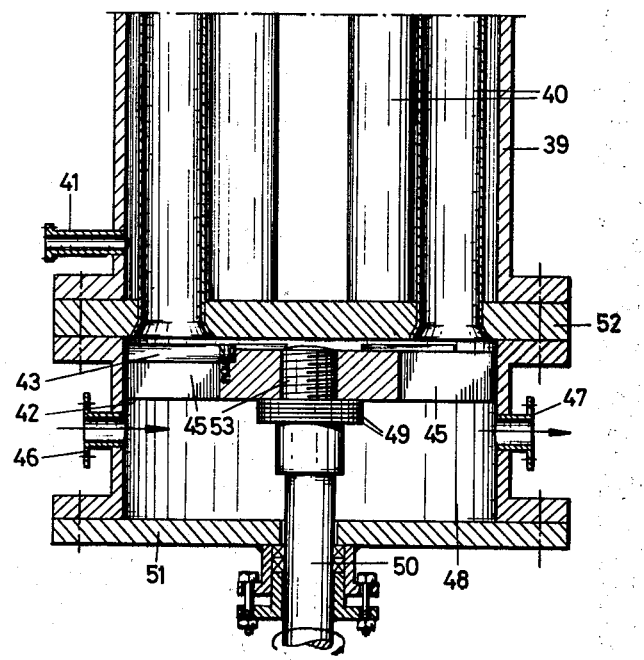
FIG. 2 is a combination of two half cross-sections.

FIG. 2 is a combination of half the cross section of the shell and tube heat exchanger parallel to the long axis of the tubes and a cross section of the lower part of the heat exchanger with the 'cutting disk', according to a plane parallel to the axis of the tubes.

At 40 the wall of a tube is shown and at 39 the wall of the shell enclosing the tubes. At 41 we see the opening for the introduction of coolant. The tubes at their bottom end are fastened to the tube sheet 52.

The disk 42 is screwed on the axle 50, the upper end of which is threaded 53. The axle 50 passes through the bottom sheet 51. At 43 one of the knives protruding out the upper surface of the disk is shown. The distance between the cutting edge of the knives and the bottom end of the tubes can be adjusted by variation of the thin metal rings 49.

The inlet and outlet for the recirculated mother liquor are shown at respectively 46 and 47, while 48 is the 'mixing chamber' where the crystal agglomerates are mixed with the recirculated mother liquid to form a pumpable slurry.

Figure 3:
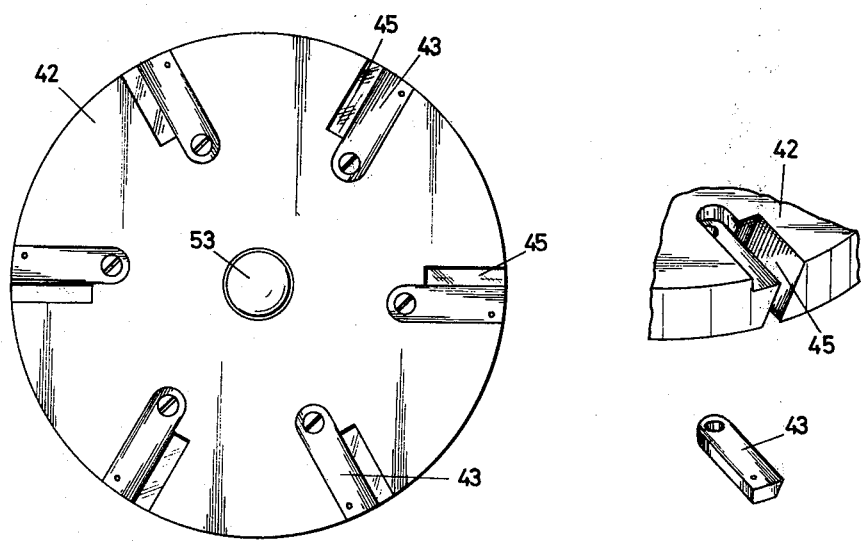
FIG. 3 shows the cutting disc.

FIG. 3 shows a top view of the cutting disk 42 and FIG. 3A part of the disk in perspective, FIG. 3B showing a perspective of knife 43. In this perspective drawing the space 44 for inserting the replaceable knife 43 is shown for only one knife. At 45 we see a slot through which the particles of crystal agglomerates created by the action of the cutting knives pass through the disk.

Figure 4:
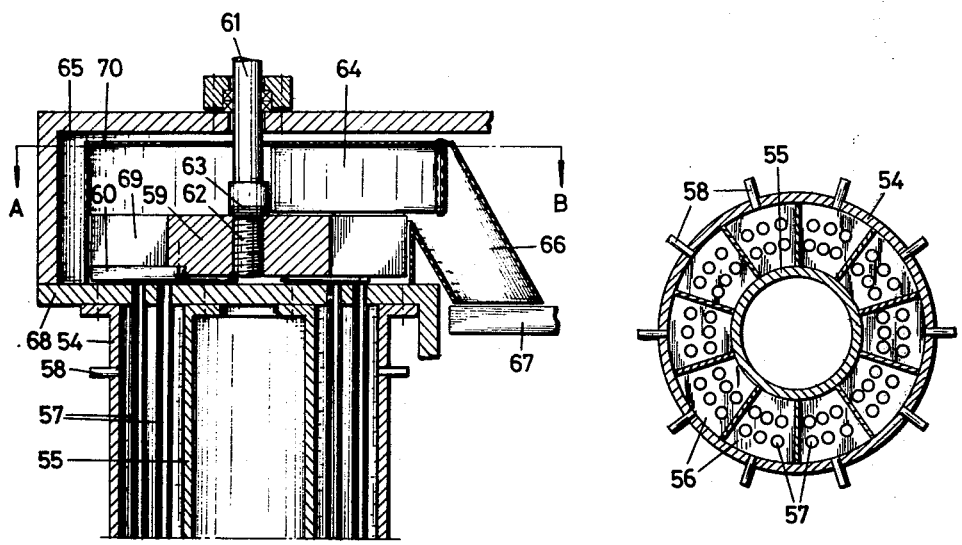
FIG. 4 shows the crystal producing apparatus.

FIG. 4 refers to an apparatus for producing crystals agglomerates which have to be freeze-dried. In this particular case ten shell and tube heat exchangers are built together and serviced by one cutting disk. The figure is a combination of half the cross section of the bundle of shell and tube heat exchangers perpendicular to the axis of the tubes and a cross section of the upper part of the bundle of heat exchangers parallel to the axis of the tubes.

FIG. 4A is a section taken along line 4A—4A of FIG. 4.

Figure 5:
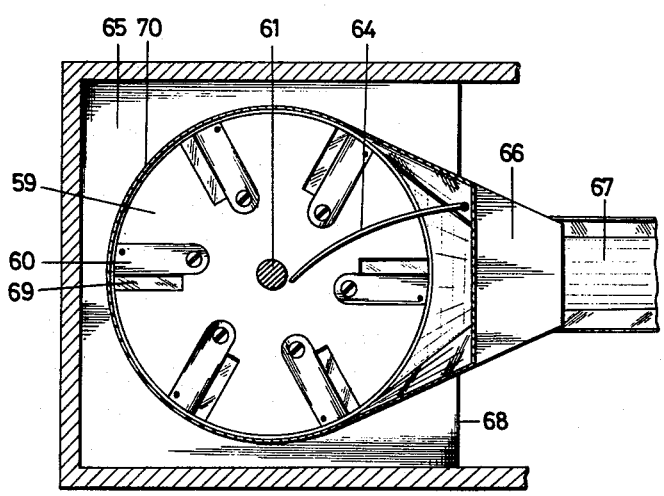
FIG. 5 is another cross-section.

FIG. 5 is a cross section perpendicular to the axis of the tubes, according to the line 5—5 in FIG. 4.

The ten bundles of tubes 57 are arranged in the space between the shells 54 and 55, which is divided in ten compartments. The connection of the sections in parallel is the same as the connection of the ten separate tube and shell heat exchangers in FIG. 1. The sequence of functioning is also the same as for the apparatus of FIG. 1. The inlet is however in this case at the bottom end of the tubes, while the solidified mass emerges at their upper end when the apparatus is in operation. The ten compartments are separated by isolated walls 56. The passageway for coolant is shown at 58. The tubes at their upper end are fastened to the tube sheet 68. At the upper end of the ten compartments, just above the tube sheet 68, the cutting disk 59 is shown with the knives 60. The disk 59 is screwed onto the axle 61 at the threaded end 62 of that axle. The distance between the tube sheet 68 and the knives can be adjusted by the thin metal rings 63. The disk 59 rotates within a housing 70 at one side connected to a chute 66.

The crystal agglomerates, created by cutting up the mass emerging from the tubes pass through the slots in the disk, one of which is shown in FIG. 5 at 69. It is advantageous in this case, in order to facilitate the passage of the crystal agglomerates through the slots, to give these slots a tapering shape, with their wide end uppermost. The crystal agglomerates passing through the slots will be scraped off the disk by the guiding plate 64 and, guided to the chute 66, will fall on the vibrating conveyor 67.

The space 65 in which the housing 70, the chute 66 and the vibrating conveyor 67 are located is integrated to the freeze drying chamber, where the ultimate separation takes place by sublimating away the ice.

In the underfollowing examples will be given of processes accomplished with the apparatuses described above.

EXAMPLE 1

A sugar solution containing 10% dry solid is concentrated to about 20% dry solids (specific mass of 10% d.s. is 1.04 kg/l, $T_{equilibrium} = -0.6°$ C., specific mass 20% d.s. is 1.09 kg/l, $T_{equilibrium} = -1,5°$ C.). The apparatus used is represented in the FIGS. 1, 2 and 3.

Each heat exchanger is operated semi-continuously with a cycle time of 30 minutes, made up of a freezing time of about 26 minutes, a melting time of about 1 minute and an ejection time of about 3 minutes. The crystallizer consists of 10 shell and tube heat exchangers, each containing 6 stainless steel tubes with an internal diameter of 25 mm and a length of 3000 mm. Below each heat exchanger a rotating disk, provided with 6 knives with a thickness of 5 mm is mounted. The knife protrude 1.8 mm above the disk. The distance between the edge of each knive and the bottom end of the tubes is 3 mm. The disk is provided with apertures through which the ice particles pass into a mixing vessel below. The disk rotates at a speed of 79 revolutions a minute. The total holding capacity of the tubes is about 8.8 liters per heat exchanger. At the end of the ejection period, frozen plugs of a length of about 45 cm, which approximately equal 1.3 liters, remain in the heat exchanger. At that moment there is about 7.5 liters fresh extract of 10% dry solids in the space above the frozen plugs. This new batch of extract weighs about 7.8 kg and has a temperature of 0° C.

The extract is cooled by means of evaporating coolant. The temperature difference between the contents of the tubes and the evaporation chamber formed by the space between the shell and the tubes is kept at about 8° C. 26 minutes after the start of freezing the original 7.8 kg extract has been transformed into about 3.9 kg ice and about 3.9 kg concentrated extract with a d.s. content of about 20%. The temperature of the ice columns is then about −1.5° C. The space between the shell and the tubes, i.e. the evaporation chamber of the refrigerating unit, is connected to the condensation chamber of the refrigerating unit so that heat is briefly applied to the tubes. A thin film of liquid forms on the walls of the tubes. Then the valve in the feed line with fresh feed solution is opened, so that the pressure of the feed pump is applied to the columns of ice and enclosed concentrate. The pressure differential across the length of the heat exchanger is about 5 atm. Owing to the difference in pressure the frozen columns are expelled from the tubes for a distance of about 2.55 m and are simultaneously broken up by the rotating disk with knives.

The ice conglomerates formed are mixed with recycled concentrate in the mixing vessel to give a slurry with an ice concentration of about 30%. The slurry is transported to the washing column.

When the ice column has been expelled far enough, a new freezing cycle starts in the heat exchanger, after the valve in the feed line has been closed. At the same time expulsion starts in the next heat exchanger. At any given moment 9 heat exchangers are freezing extract and 1 heat exchanger is releasing and expelling the ice columns formed. The total concentrating capacity of the apparatus is about 75 liters fresh extract every 30 minutes, i.e. 150 liters fresh extract per hour. The washing column removes about 78 kg ice per hour. The capacity of the recycling pump is about 96 liters per hour (104 kg concentrate per hour).

EXAMPLE 2

Coffee extract containing 10% dry solid is concentrated to about 34% dry solid (specific mass of 10% dry solid is 1.04 kg/l, specific mass of 34% dry solid is 1.16 kg/l). The apparatus used and its operation are described in example 1. The only differences are the following:

26 minutes after the start of freezing the original 7.8 kg extract has been transformed into about 5.5 kg ice and about 2.3 kg concentrated extract with a d.s. content of about 34%. The total concentrating capacity of the apparatus is about 75 l fresh extract every 30 minutes, i.e. 150 l fresh extract per hour. The washing column removes about 110 kg ice per hour. The capacity of the recycling pump is about 182 l per hour (211 kg concentrate per hour).

EXAMPLE 3

Coffee extract containing 32% d.s. is frozen below the eutectic point 66% d.s. (specific mass of 32% d.s. is 1.14 kg/l). Eutectic temperature is about −26° C. The apparatus used is represented in FIGS. 4 and 5.

Each heater exchanger is operated semi-continuously with a cycle time of 30 minutes, made up of a freezing time of about 26 minutes, a melting time of about 1 minute and an ejection time of about 3 minutes. The crystallizer consists of 10 shell and tube heat exchangers, each containing 6 stainless steel tubes with an internal diameter of 25 mm and a length of 3000 mm. On top of the heat exchangers a rotating disk, provided with 6 knives with a thickness of 5.0 mm is mounted. The knives protrude 2,5 mm beyond the disk. The disk is provided with apertures through which the ice particles pass into the collector. The disk rotates at a speed of 57 revolutions a minute. The total holding capacity of the tubes is about 8.8 l per heat exchanger. At the end of the ejection period, frozen plugs of a length of about 45 cm, which approximately equal 1,3 l, remain in the heat exchanger. At that moment there is about 7.5 l fresh extract of 32% d.s. in the space above the frozen plugs. This new batch of extract weighs about 8.6 kg and has a temperature of 0° C.

The extract is cooled by means of evaporating coolant. The temperature difference between the contents of the tubes and the evaporation chamber formed by the space between the shell and the tubes is kept at about 20° C. 26 minutes after the start of freezing the original 8.6 kg extract has been transformed into about 4.4 kg ice and about 4.2 kg solid concentrated extract with a d.s. content of about 66% (eutectic mixture). Then melting is started. The space between the shell and the tubes, i.e. the evaporation chamber of the refrigerating unit, is used as a part of the condensation chamber of the refrigerating unit so that heat is applied to the tubes. A thin film of liquid forms on the walls of the tubes. Then the valve in the feed line with fresh feed solution is opened, so that the pressure of the feed pump is applied to the columns of ice and eutectic mixture. The pressure differential across the length of the heat exchanger is about 5 atm. Owing to the difference in pressure the frozen columns are expelled from the tubes into the vacuum chamber of the freeze dryer for a distance of about 2.55 m and are simultaneously broken up by the rotating disk with knives.

The ground up material is collected and transported to a conveyor, which transports it further into the freeze drier, as described in U.S. Pat. No. 3,574,951.

When the ice column has been expelled far enough, a new freezing cycle starts in the heat exchanger, after the valve in the feed line has been closed. At the same time expulsion starts in the next heat exchanger. At any given moment 9 heat exchangers are freezing extract and 1 heat exchanger is expelling the ice columns formed. The total granulate capacity of the apparatus is about 75 l fresh extract every 30 minutes, i.e. 150 l fresh extract per hour. This means 171 kg granulate per hour is fed into the freeze drier. This produces 56.4 kg dried coffee an hour (54.7 kg d.s. and 1.7 kg $H_2O$) and 114.6 kg $H_2O$.

I claim:

1. A process for concentrating fruit juice or coffee extract by freezing and recovering mother liquor thereby formed, comprising subjecting said system to batchwise treatment in the following sequential steps;
    a. a first step wherein a batch of the liquid is confined at rest within a plurality of long, narrow tubes having dimensions so that maximum conductive distance is in the range of 5-25 mm of a static heat exchanger;

b. a second step in which heat is withdrawn from said batch so as to crystallize part of the water creating a substantially coherent matrix of ice crystals with mother liquor entrapped between the crystals in said matrix;

c. a third step wherein the matrix of crystals is released from the tubes to which it is attached by briefly supplying heat externally of the tubes so that the matrix of crystals with the mother liquor is expelled downwardly out of the heat exchanger;

d. a fourth step wherein the material expelled in step (c) is broken up by a disc at the lower extremity of the tubes to produce broken up material of a desired size, such as to permit separation of said broken up material in step (c) and leaving a portion of the crystal matrix within the tubes which is held within the tubes by the disc to plug the lower end of the tubes;

e. a fifth step in which the crystals in the mass obtained in step (d) are transferred to a wash column, therein separated from the mother liquor, and the mother liquor is recovered; and f. a sixth step in which the tubes are refilled with additional liquid.

2. A process according to claim 1 whereby mother liquor from the mechanical separation is recycled and mixed with the broken up matrix of crystals extracted from the space with large heat exchange surface so as to form a pumpable slurry.

* * * * *